United States Patent
Scozzola

(10) Patent No.: US 12,298,396 B2
(45) Date of Patent: May 13, 2025

(54) FLICKER FREQUENCY ESTIMATE

(71) Applicant: STMicroelectronics (Grenoble 2) SAS, Grenoble (FR)

(72) Inventor: Giovanni Scozzola, Saint Egreve (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 669 days.

(21) Appl. No.: 17/571,965

(22) Filed: Jan. 10, 2022

(65) Prior Publication Data
US 2022/0239824 A1    Jul. 28, 2022

(30) Foreign Application Priority Data
Jan. 22, 2021  (FR) ..................................... 2100602

(51) Int. Cl.
| | | |
|---|---|---|
| G01S 17/88 | (2006.01) | |
| G01J 1/42 | (2006.01) | |
| G01S 17/08 | (2006.01) | |
| H04N 23/745 | (2023.01) | |

(52) U.S. Cl.
CPC ............. G01S 17/88 (2013.01); G01J 1/4204 (2013.01); H04N 23/745 (2023.01); G01S 17/08 (2013.01)

(58) Field of Classification Search
CPC ...... H04N 23/745; G01J 1/4204; G01S 17/08; G01S 17/36; G01S 17/88; G01S 17/10
See application file for complete search history.

(56) References Cited

U.S. PATENT DOCUMENTS

| | | | | |
|---|---|---|---|---|
| 5,498,865 A | * | 3/1996 | Gaboury | H03F 3/08 |
| | | | | 250/214 LA |
| 9,568,603 B2 | * | 2/2017 | Yahav | H04N 23/611 |
| 2010/0157093 A1 | * | 6/2010 | Fuchikami | H04N 19/105 |
| | | | | 348/226.1 |
| 2013/0147394 A1 | * | 6/2013 | Macknik | H05B 47/10 |
| | | | | 315/307 |
| 2016/0104031 A1 | * | 4/2016 | Shotton | G06V 20/64 |
| | | | | 382/154 |
| 2018/0059218 A1 | * | 3/2018 | Buettgen | G01S 7/497 |
| 2020/0389582 A1 | * | 12/2020 | Herman | H04N 23/71 |
| 2021/0176390 A1 | * | 6/2021 | Okuike | H04N 9/77 |
| 2021/0216768 A1 | * | 7/2021 | Yi | G01S 7/497 |

FOREIGN PATENT DOCUMENTS

| | | |
|---|---|---|
| EP | 2827579 A1 | 1/2015 |
| JP | 2020129756 A | 8/2020 |
| WO | 2015167580 A1 | 11/2015 |

* cited by examiner

*Primary Examiner* — Jennifer D Bennett
(74) *Attorney, Agent, or Firm* — Slater Matsil, LLP

(57) ABSTRACT

A method for estimating a flicker frequency of a light source includes: obtaining, with a time-of-flight sensor, a profile of a light signal emitted by a light source; performing spectral analysis on the profile of the light signal emitted by the light source; and estimating a flicker frequency of the light source based on the spectral analysis of the profile of the light signal emitted by the light source.

21 Claims, 2 Drawing Sheets

FLICKER FREQUENCY ESTIMATE

CROSS-REFERENCE TO RELATED APPLICATIONS

This application claims the priority benefit of French patent application number FR2100602, filed on Jan. 22, 2021, entitled "Estimation de fréquence de papillotement," which is hereby incorporated by reference.

TECHNICAL FIELD

The present disclosure relates generally to an electronic system and method, and, in particular embodiments, to a system and method for estimating flicker frequency.

BACKGROUND

The flickering of an artificial light source, for example, an incandescent lamp powered with an AC current by an electric distribution network, adversely affects the operation of electronic devices, such as cell phones, located close to the light source. In the case where these devices comprise an image sensor, the flickering of the light source typically causes the occurrence of dark bands, or fringes, on the images and the videos generated by this sensor.

To overcome this problem, current cell phones generally integrate an ambient light sensor (ALS) capable of estimating the flicker frequency of the light source close to which they are located. This enables to adapt image and video captures according to this frequency. The provision of such a sensor however causes an increase in the acquisition cost and an increase in the size and the complexity of the cell phone.

SUMMARY

There is a need to improve current flicker frequency estimation devices and methods.

Some embodiments relate to devices adapted to estimate a flicker frequency of an artificial light source external to the device.

An embodiment overcomes all or part of the disadvantages of known flicker frequency estimation devices and methods.

An embodiment provides a method comprising a step of estimation, by using a time-of-flight sensor of a device, of a flicker frequency of a light source.

An embodiment provides a device comprising a time-of-flight sensor and a circuit adapted to estimating, by using the time-of-flight sensor, a flicker frequency of a light source.

According to an embodiment, the estimation of the flicker frequency is performed by spectral analysis.

According to an embodiment, the estimation of the flicker frequency comprises:

a) obtaining, by the time-of-flight sensor, a profile of a light signal emitted by the light source; and
b) deducing, from the profile of the light signal, the flicker frequency of the light source.

According to an embodiment, the profile of the light signal emitted by the light source is obtained by luminance measurements.

According to an embodiment, the luminance measurements are performed by a photodetector of the time-of-flight sensor.

According to an embodiment, the luminance measurements are performed at an acquisition frequency at least twice greater than the flicker frequency of the light source.

According to an embodiment, the luminance measurements are performed at an acquisition frequency at least twice greater than a frequency of power supply, by an electric network, of the light source.

According to an embodiment, the flicker frequency of the light source is deduced after Fourier transformation of the profile of the light signal emitted by the light source.

According to an embodiment, the flicker frequency of the light source is further deduced after the application of at least one filter around a frequency and the comparison with a threshold.

According to an embodiment, the estimation is performed prior to each capture of an image or of a video by an image sensor of the device integrating the time-of-flight sensor.

According to an embodiment, the light source is external to the device.

According to an embodiment, the light source is artificial and comprises at least one light bulb, preferably incandescent.

BRIEF DESCRIPTION OF THE DRAWINGS

The foregoing and other features and advantages of the present invention will be discussed in detail in the following non-limiting description of specific embodiments and implementation modes in connection with the accompanying drawings, in which.

DETAILED DESCRIPTION OF ILLUSTRATIVE EMBODIMENTS

Figure 1:
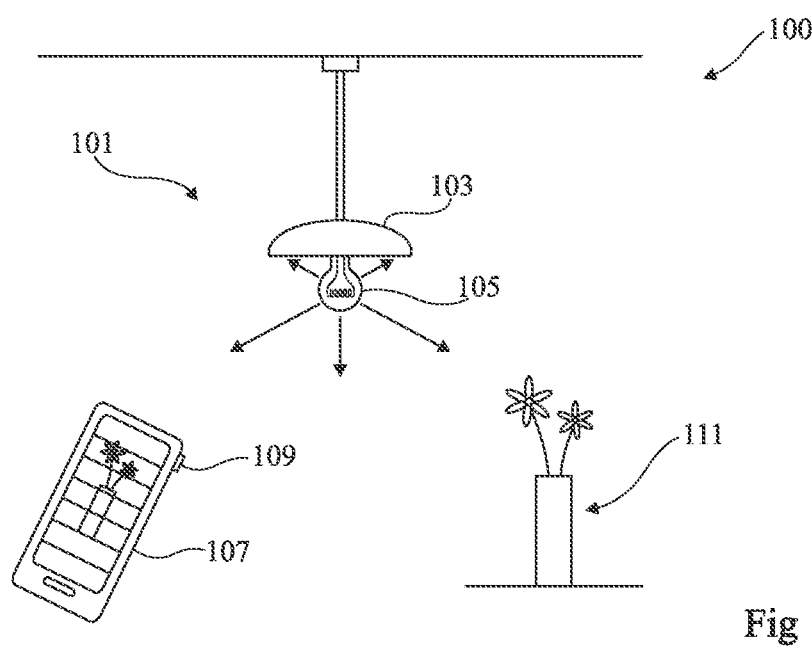
FIG. 1 schematically illustrates an example of a system of the type to which the described embodiments and implementation modes apply as an example.

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the way in which the estimation of the flicker frequency is used to modify the operation of the electronic device is not detailed, the described embodiments and implementation modes being compatible with usual circuits and methods aiming at modifying the operation of an electronic device according to a flicker frequency of an external artificial light source.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

FIG. 1 schematically illustrates an example of a system 100 of the type to which the described embodiments and implementation modes apply as an example.

In the shown example, system 100 comprises a light source 101. Light source 101 is an artificial light source. Artificial light source means a light source powered by an electric source. Source 101 is for example different from the sun, which is generally called natural light source. In this example, light source 101 comprises a lamp or a luminary 103. Luminary 103 is for example hung to a ceiling of a room located inside of a house.

Luminary 103 for example comprises a light bulb 105. Light bulb 105 is for example an incandescent light bulb or a light bulb comprising at least one light-emitting diode (LED). Light bulb 105 is for example powered with an AC current by an electric distribution network (not shown) having luminary 103 coupled thereto. As an example, the electric distribution network supplies light bulb 105 with a sinusoidal power supply signal having a frequency typically equal to approximately 50 or 60 Hz.

The powering of light bulb 105 with an AC current generates periodic luminance variations of light source 101. These luminance variations are generally designated with the term flicker or flickering. The flickering of light source 101 is characterized by a frequency f substantially equal to the frequency of the signal powering light bulb 105, that is, approximately 50 or 60 Hz in this example.

In the shown example, system 100 further comprises an electronic device 107. Device 107 is for example a cell phone, or smartphone. Device 107 for example comprises at last one image sensor 109. Image sensor 109 for example enables device 107 to take a picture of an object 111 or to record a video of object 111.

In the shown example, light bulb 105 illuminates device 107 and object 111. Assuming that it is desired to take a picture of object 111, the image sensor 109 of device 107 is for example exposed for a duration D. Duration D is for example longer than a period T equal to the inverse of the flicker frequency f of source 101 (T=1/f). As an example, duration D is from three to ten times greater than period T. As a result, the luminance of source 101 for example varies, for example decreases and then increases several times between minimum and maximum luminance levels, for the duration D of exposure of image sensor 109.

Sensor 109 is for example a sensor of complementary metal-oxide-semiconductor (CMOS) type, or CMOS sensor. Sensor 109 for example comprises a so-called rolling shutter operation. Sensor 109 for example has a row addressing, adapted to successively reading rows or columns of adjacent pixels of image sensor 109 during duration D of exposure. As an example, during an image capture, image sensor 109 is vertically scanned, for example, from top to bottom, to successively read adjacent pixel rows of the sensor.

During the capture of an image of object in, due to the flickering of source 101 combined with the rolling shutter effect, certain pixel rows of the sensor receive more light than others. As a result, the image of object 111 by the sensor of device 107 for example exhibits bands, or fringes. The image for example more precisely shows dark horizontal bands, corresponding to pixel rows having been read when source 101 was generating a minimum luminance, and brighter horizontal bands, corresponding to pixel rows having been read when source 101 was generating a maximum luminance. In a case where the flickering is such that source 101 emits substantially no light for a short time, for example, each time the power supply signal becomes zero (that is, every half-period T/2), the image undesirably exhibits black bands corresponding to the different pixel rows having been read at each short extinguishing of source 101.

One can thus observe, in the picture of object 111 obtained by the sensor of device 107, an alternation of dark or black strips and of brighter or lighter bands. These bands are horizontal, in the above-described case where the sensor pixels are vertically scanned, row by row, or vertical, in another case where the sensor pixels are horizontally scanned, column by column. The alternation of dark bands and of light bands very adversely affects the quality of the image of object 111 captured by device 107.

To overcome this disadvantage, it may be provided to integrate an ambient light sensor (ALS) in device 107. Such a sensor would enable to estimate the flicker frequency f of light source 101 to control the image sensor 109 of device 107 so as to avoid or limit the occurrence of dark and light bands on the picture of object 111. This would however cause an increase in the acquisition cost and an increase in the complexity and the size of device 107.

Although, in the example illustrated in FIG. 1, light source 101 comprises a single luminary 103 comprising a single light bulb 105, it is understood that light source 101 may comprise one or a plurality of luminaries, each comprising one or a plurality of light bulbs.

Figure 2:
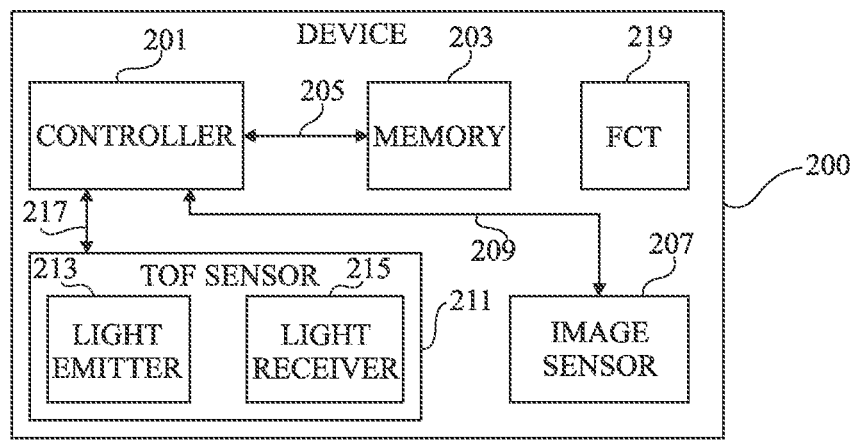
FIG. 2 schematically shows in the form of blocks an electronic device adapted to estimating a flicker frequency according to an embodiment.

FIG. 2 schematically shows in the form of blocks an electronic device 200 (DEVICE) adapted to estimate a flicker frequency according to an embodiment. As an example, device 200 is a cell phone or smartphone, a touch pad, a photographic camera, etc.

In the shown example, device 200 comprises a microcontroller 201 (CONTROLLER). Microcontroller 201 for example forms part of a microprocessor of device 200. Microcontroller 201 is for example configured to execute program code instructions allowing the operation of device 200.

In the shown example, device 200 further comprises a memory 203 (MEMORY). Memory 203 for example comprises at least one non-volatile storage area, for example adapted to store the program code instructions executed by microcontroller 201. As an example, the non-volatile storage area of memory 203 more precisely enables to store a software operational system or firmware and one or a plurality of application software systems. Memory 203 for example further comprises at least one volatile storage area, for example adapted to store variables linked to the execution of program code instructions by microcontroller 201. Memory 203 is for example connected to microcontroller 201 by a data bus 205.

In the shown example, device 200 further comprises an image sensor 207 (IMAGE SENSOR). The image sensor 207 of device 200 is for example similar to the image sensor 109 of the device 107 of FIG. 1. The image sensor 207 of device 200 is for example connected to microcontroller 201 by another data bus 209. Image sensor 207 is for example controlled by microcontroller 201 to capture images, these image captures being for example stored in the memory 203 of device 200.

In the shown example, device 200 further comprises a time-of-flight sensor 211 (TOF SENSOR). Sensor 211 is for example adapted to perform time-of-flight distance measurements (ToF) between device 200 and one or a plurality of objects located close to device 200. In this example, sensor 211 more precisely comprises a light emission component 213 (LIGHT EMITTER) and another light reception component 215 (LIGHT RECEIVER). As an example, light emission component 213 is a photodiode, for example, a laser photodiode, and light reception component 215 is a photodetector, for example, a photodetector adapted to converting an infrared radiation into an electric signal.

As an example, time-of-flight sensor 211 may implement time-of-flight distance measurements called direct (dToF) or indirect (iToF).

In the case of direct time-of-flight (dToF) measurements, a time period taken by each pulse, originating from light emission component 213, to reach light reception component 215, is for example estimated. The time of flight, which is then converted into a distance measurement, is thus determined.

In the case of indirect time-of-flight (iToF) measurements, the phase of the signal received by light reception component 215 is for example compared with the phase of the signal emitted by light emission component 213. The time of flight is thus estimated and then converted into a distance measurement.

Time-of-flight sensor 211 is for example connected to microcontroller 201 by another data bus 217. Tim-of-flight sensor 211 is for example controlled by microcontroller 201 to perform distance measurements, these distance measurements being for example then stored in the memory 203 of device 200.

Device 200 may also comprise one or a plurality of other elements. These elements are symbolized, in FIG. 2, by a functional block 209 (FCT).

Figure 3:
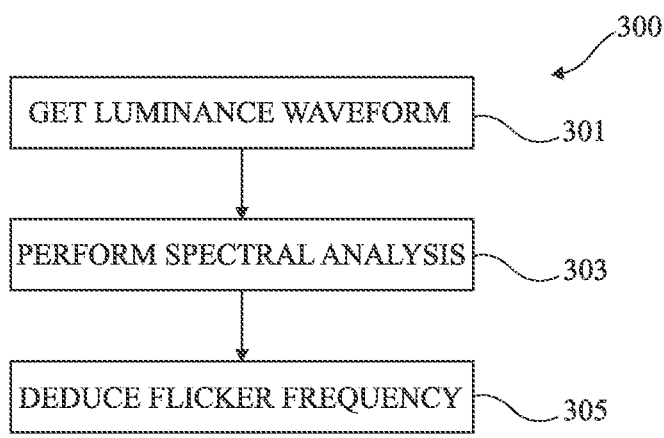
FIG. 3 shows a simplified diagram of a method of estimating a flicker frequency according to an implementation mode.

FIG. 3 shows a simplified flowchart of a method 300 of estimation, for example, by device 200 (FIG. 2), of a flicker frequency, for example, the flicker frequency f of light source 101 (FIG. 1) according to an implementation mode. As an example, the memory 203 of device 200 (FIG. 2) comprises program code instructions enabling to implement the method 300 of FIG. 3 when these instructions are executed by microcontroller 201.

In the shown example, method 300 comprises a step 301 (GET LUMINANCE WAVEFORM) of obtaining, by time-of-flight sensor 211 (FIG. 2), of a profile representative of a light signal emitted by light source 101. The component 215 of time-of-flight sensor 211 is for example used to restore, by sampling, a waveform corresponding to the signal emitted by light source 101.

In the shown example, method 300 further comprises another step 303 (PERFORM SPECTRAL ANALYSIS), subsequent to step 301, of performing of a spectral analysis from the profile representative of the light signal emitted by light source 101. A frequency spectrum associated with the waveform corresponding to the signal emitted by source 101 is thus for example obtained.

In the shown example, method 300 further comprises still another step 305 (DEDUCE FLICKER FREQUENCY), subsequent to step 303, of deduction of the flicker frequency f of light source 101, for example, based on the frequency spectrum obtained at the end of step 303.

As an example, method 300 is implemented prior to each capture of an image or of a video by the image sensor 207 of device 200 integrating time-of-flight sensor 211.

Figure 4:
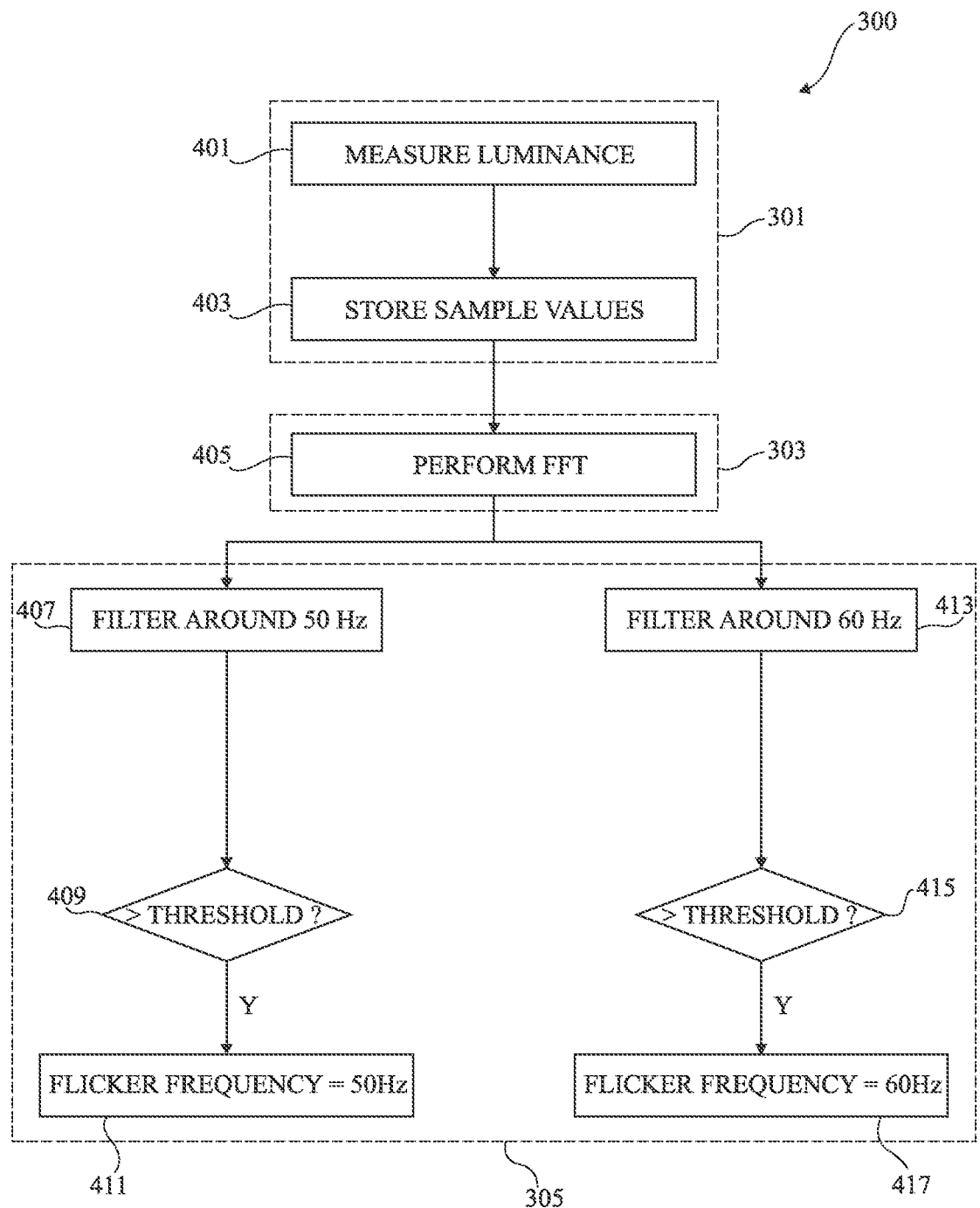
FIG. 4 shows an example of a more detailed flowchart of the method of FIG. 3.

FIG. 4 shows a more detailed example of flowchart of the method 300 of FIG. 3.

As a step 401 (MEASURE LUMINANCE), a plurality of measurements of the light signal received by the photodetector 215 of time-of-flight sensor 211 (FIG. 2), for example, luminance or light intensity measurements, are performed. These measurements are for example performed periodically, for example, at an acquisition or sampling frequency at least twice greater than the flicker frequency f of light source 101. As an example, the sampling frequency is in the range from 100 to 500 Hz, for example, equal to approximately 170 Hz (that is, one measurement every 6 ms approximately).

As an example, step 401 is carried out by pointing device 200 towards light source 101. This particularly enables to maximize the exposure of the photodetector 215 of time-of-flight sensor 211.

At another step 403 (STORE SAMPLE VALUES), subsequent to step 401, the luminance values measured at step 401 are stored into memory 203 (FIG. 2). The waveform or the profile representative of the light signal emitted by light source 101 is thus obtained.

At still another step 405 (PERFORM FFT), subsequent to step 403, a Fourier transform, for example, a Fast Fourier Transform (FFT), of the profile representative of the light signal emitted by light source 101, is performed. The frequency spectrum associated with the waveform corresponding to the signal emitted by source 101 is thus obtained.

At still another step 407 (FILTER AROUND 50 Hz), subsequent to step 405, a filter around a value for example equal to approximately 50 Hz is applied to the frequency spectrum of step 405. A reduced frequency spectrum around the 50-Hz value is thus for example obtained.

At still another step 409 (>THRESHOLD?), subsequent to step 407, the reduced frequency spectrum resulting from step 407 is for example compared with a threshold. If the threshold is reached or exceeded (output Y of block 409), it is deduced therefrom, at still another step 411 (FLICKER FREQUENCY=50 Hz) subsequent to step 409, that light source 101 has a flicker frequency f equal to approximately 50 Hz (which may be indicated, e.g., by generating a flag, such as a signal).

At still another step 413 (FILTER AROUND 60 Hz), subsequent to step 405, a filter around a value for example equal to approximately 60 Hz is applied to the frequency spectrum of step 405. A reduced frequency spectrum around the 60-Hz value is thus for example obtained.

At still another step 415 (>THRESHOLD?), subsequent to step 413, the reduced frequency spectrum resulting from step 413 is for example compared with a threshold. If the threshold is reached or exceeded (output Y of block 415), it is deduced therefrom, at still another step 417 (FLICKER FREQUENCY=60 Hz) subsequent to step 415, that light source 101 has a flicker frequency f equal to approximately 60 Hz. The threshold of step 415 is for example equal to the threshold of step 409.

In the shown example, steps 407, 409, and 411 are respectively carried out in parallel with steps 413, 415, and 417. As a variant, it may for example be provided to carry out steps 413, 415, and 417 after step 411, or to carry out steps 407, 409 and 411 after step 417.

The method discussed hereabove in relation with FIG. 4 enables to estimate, by using the time-of-flight sensor 211 of device 200, the flicker frequency f of light source 101.

An advantage of the embodiments and of the implementation modes previously described in relation with FIGS. 3 and 4 lies in the fact that the estimation of the flicker frequency f of light source 101 is performed without using a dedicated sensor such as an ambient light sensor (ALS). In the example of device 200, advantage is more specifically taken of the time-of-flight sensor 211 already present in the device to enable to estimate the flicker frequency f of source 101 without using a dedicated sensor. The acquisition cost, the dimensions, and the complexity of device 200 are thus decreased with respect to a device 200 which would further integrate a sensor dedicated to the estimation of the flicker frequency f of light source 101.

Various embodiments and variants have been described. Those skilled in the art will understand that certain features of these various embodiments and variants may be combined, and other variants will occur to those skilled in the art. In particular, although an example of a method 300 enabling to determine whether light source 101 has a flicker frequency f equal to approximately 50 or 60 Hz has been described, the described embodiments and implementation modes are not limited to this specific case. The method 300 of FIGS. 3 and 4 may in particular be adapted to determining the flicker frequency f of source 101 in different frequency ranges. Further, filtering steps 407 and 413 may be omitted.

Finally, the practical implementation of the described embodiments and variants is within the abilities of those skilled in the art based on the functional indications given hereabove. In particular, the frequency of acquisition of the measurements, the implementation of the Fourier transform, the filtering and the selection of values for the thresholds of steps 409 and 415 are within the abilities of those skilled in the art. Further, it will be within the abilities of those skilled in the art to adapt the operation of device 200, in particular of image sensor 207, according to the estimation of the flicker frequency f of light source 101.

What is claimed is:

1. A method comprising:
    sampling direct ambient luminance measurements of a light source using a time-of-flight sensor to obtain a profile of a light signal emitted by the light source;
    performing spectral analysis on the profile of the light signal emitted by the light source; and
    estimating a flicker frequency of the light source based on the spectral analysis of the profile of the light signal emitted by the light source.

2. The method of claim 1, further comprising sampling the direct ambient luminance measurements using a photodetector of the time-of-flight sensor.

3. The method of claim 2, wherein the direct ambient luminance measurements are sampled at an acquisition frequency at least twice greater than the flicker frequency of the light source.

4. The method of claim 2, wherein the direct ambient luminance measurements are sampled at an acquisition frequency at least twice greater than a power supply frequency of the light source.

5. The method of claim 4, wherein the power supply frequency is about 50 Hz or about 60 Hz.

6. The method of claim 1, wherein performing the spectral analysis comprises performing a Fourier transformation of the profile of the light signal emitted by the light source to generate a first output.

7. The method of claim 6, wherein performing the spectral analysis further comprises applying to the first output a filter around a first frequency to generate a filtered output, and wherein estimating the flicker frequency comprises comparing the filtered output with a threshold.

8. The method of claim 1, further comprising:
    capturing an image or a video by an image sensor of a device separate from the time-of-flight sensor.

9. The method of claim 8,
    wherein the direct ambient luminance measurements are sampled at an acquisition frequency at least twice greater than a power supply frequency of the light source, and
    wherein a capture frequency of the image or the video is less than the power supply frequency, the capture frequency being the inverse of an exposure time of the image or of each frame of the video.

10. The method of claim 8, wherein the light source is external to the device.

11. The method of claim 1, wherein the light source is artificial and comprises a light bulb.

12. The method of claim 11, wherein the light bulb is an incandescent light bulb.

13. A device comprising:
    a time-of-flight sensor configured to
        sample direct ambient luminance measurements of a light source to obtain a profile of a light signal emitted by the light source; and
    a controller configured to
        perform spectral analysis on the profile of the light signal emitted by the light source, and
        estimate a flicker frequency of the light source based on the spectral analysis of the profile of the light signal emitted by the light source.

14. The device of claim 13, wherein the time-of-flight sensor comprises a photodetector configured to sample the direct ambient luminance measurements of the light signal emitted by the light source.

15. The device of claim 14, wherein the photodetector is configured to perform the direct ambient luminance measurements at an acquisition frequency at least twice greater than a power supply frequency of the light source.

16. The device of claim 15, wherein the controller or the time-of-flight sensor is configured to:
    perform the spectral analysis by performing a Fourier transformation of the profile of the light signal emitted by the light source to generate a first output and applying a filter around a first frequency to generate a filtered output; and
    estimate the flicker frequency by comparing the filtered output with a threshold.

17. The device of claim 16, wherein the first frequency is about 50 Hz or about 60 Hz.

18. A device comprising:
    a memory;
    a time-of-flight sensor comprising a photodetector configured to
        receive a light signal emitted by a light source, and
        sample direct ambient luminance measurements of the light signal emitted by the light source,
        wherein the time-of-flight sensor is configured to store samples of an output of the photodetector in the memory; and
    a controller configured to:
        perform a Fourier transform based on the stored samples to generate a first output,
        filter the first output with a first filter around a first frequency to generate a first filtered output,
        compare the first filtered output with a first threshold, and estimate a flicker frequency of the light source, wherein estimating the flicker frequency of the light source comprises, when the first filtered output is higher than the first threshold, generating an indication that the flicker frequency of the light source is at the first frequency.

19. The device of claim 18, wherein the controller is further configured to:
  filter the first output with a second filter around a second frequency to generate a second filtered output, the second frequency being different than the first frequency,
  compare the second filtered output with a second threshold, and
  when the second filtered output is higher than the second threshold, generate an indication that the flicker frequency of the light source is at the second frequency.

20. The device of claim 19, wherein the first frequency is about 50 Hz and the second frequency is about 60 Hz.

21. The device of claim 18, further comprising:
  an image sensor configured to capture an image or a video,
  wherein the controller is further configured to estimate the flicker frequency of the light source prior to each capture of the image or of the video by the image sensor.

\* \* \* \* \*